United States Patent Office 3,458,541
Patented July 29, 1969

3,458,541
13 - ALKYL - 17 - [BIS(2-HYDROXYETHYL)AMINO]-GON-4-EN-3-ONES, DINITRATES
Gerhard R. Wendt, Havertown, and Kurt W. Ledig, Philadelphia, Pa., assignors to American Home Products Corporation, New York, N.Y., a corporation of Delaware
No Drawing. Filed June 17, 1966, Ser. No. 558,283
Int. Cl. C07c *169/10;* A61k *17/00*
U.S. Cl. 260—397.4
7 Claims

ABSTRACT OF THE DISCLOSURE

Steroid nitrates are disclosed, of the 13-alkyl-17-[bis-(2-hydroxyethyl)amino]-gon-4-en-3-one type, useful as cardiovascular agents.

---

This invention relates to and has for its objects the provision of new physiologically active compounds, novel processes for their production and new intermediates useful in the preparation thereof.

More particularly this invention relates to compounds of the formula

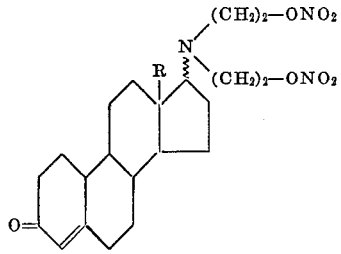

wherein ($) represents the alpha or beta position and R is an alkyl group having less than eight carbon atoms, such as methyl, ethyl, propyl, butyl and the like.

The final products of this invention are physiologically active substances which may be used as cardiovascular agents, particularly as vasodilators.

The compounds may be formulated for such administration, the concentration and/or dosage being based on the activity of the particular compound and the requirements of the patient.

The compounds of this invention can be prepared by employing the novel processes of this invention which may be represented by the following equations, wherein R is as hereinbefore defined, and Y is alkyl:

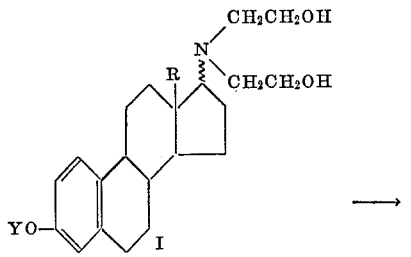

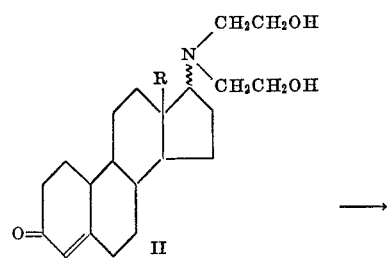

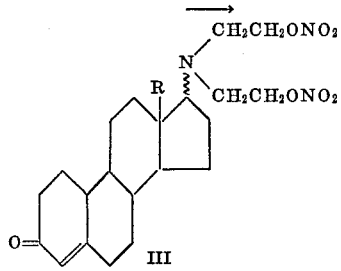

According to a feature of this invention, compounds of Formula I can be reduced to yield, inter alia, the novel compounds of Formula II by a method such as the Birch reduction.

The compounds of Formula II are then treated with a nitrating agent such as fuming nitric acid in acetic anhydride at a temperature between about +10° C. to —40° C. to yield the compounds of Formula III, which are the final products of this invention.

Among the suitable starting steroids that are utilizable in the process of this invention which are commercially available or can be made by conventional methods, such as illustrated by G. V. Rao et al. in J. Organic Chem. 27, 205 (1962), may be mentioned, 17[bis(2-hydroxyethyl)amino]-3-alkoxyestra-1,3,5(10)-triene (e.g., 17[bis(2-hydroxyethyl)amino]-3-methoxyestra-1,3,5(10)-triene); 13-lower alkyl-17-[bis(2-hydroxyethyl)amino]-3-alkoxygona-1,3,5(10)-triene (e.g., 13-ethyl-17-[bis(2-hydroxyethyl)amino]-3-methoxygona-1,3,5(10)-triene; 13-ethyl-17-[bis-(2 - hydroxyethyl)amino] - 3 - ethoxygona - 1,3,5(10)-triene); and the like.

The following examples illustrate the invention (all temperatures being in centigrade):

EXAMPLE 1

17-[bis(2-hydroxyethyl)amino]-estra-4-en-3-one

To a cooled solution of 2.0 gm. of 17-[bis(2-hydroxyethyl)amino]-3-methoxyestra-1,3,5(10)-triene, 125 ml. of tetrahydrofuran, 125 ml. of 1-methoxy-2-propanol and 300 ml. of ammonia is slowly added 2.0 gm. of lithium. The mixture is stirred until it turns white and then 20 gm. of ammonium chloride is added. Water is then added and the mixture is extracted with ether.

The ether extract is evaporated to dryness in vacuo and the residue is then stirred in a mixture of 100 ml. of methanol and 10 ml. of 2 N hydrochloric acid for one hour. The mixture is then extracted with ether. The aqueous phase is made basic with a dilute sodium hydroxide solution and extracted with ether.

The solvent is evaporated in vacuo and the residue is recrystallized from ethyl acetate-hexane to yield 700 mg. of 17-[bis(2-hydroxyethyl)amino]-estr-4-en-3-one having a melting point of 127–128°;

$\lambda_{max.}^{KBr}$ 2.95; 6.02; 6.21$\mu$

*Analysis.*—Calcd. for $C_{22}H_{35}NO_3$: C, 73.09; H, 9.76; N, 3.87. Found: C, 72.87; H, 10.01; N, 4.00.

EXAMPLE 2

13-ethyl-17-[bis(2-hydroxyethyl)amino]-gon-4-en-3-one

To a cooled solution of 1.0 gm. of 13-ethyl-17-[bis(2-hydroxyethyl)amino] - 3 - ethoxygona-1,3,5(10)-triene in 50 ml. of tetrahydrofuran, 75 ml. of 1-methoxy-2-propanol and 150 ml. of ammonia is added 1.15 gm. of lithium. The mixture is stirred until it turns a milky white and then 10.0 gm. of ammonium chloride is added.

Water is added and the mixture is extracted with ether. The organic phase is evaporated to dryness in vacuo. To the residue is added 60 ml. of methanol, the mixture is stirred and 5.0 ml. of 2 N hydrochloric acid is added dropwise. Stirring is continued for one hour and then the mixture is extracted with ether.

The aqueous phase is made basic with dilute sodium hydroxide solution and then extracted with ether. The organic phase is washed with water, dried and evaporated in vacuo to yield crystalline 13-ethyl-17-[bis(2-hydroxyethyl)amino]-gon-4-en-3-one.

EXAMPLE 3

13-propyl-17-[bis(2-hydroxyethyl)amino]-gon-4-en-3-one

Following the procedure of Example 2 but substituting 13-propyl-17-[bis(2-hydroxyethyl)amino] - 3 - methoxygona - 1,3,5(10) - triene for 13-ethyl-17-[bis(2-hydroxyethyl)amino]-3-ethoxygona-1,3,5(10)-triene there is obtained 13 - propyl-17-[bis(2-hydroxyethyl)amino]-gon-4-en-3-one.

EXAMPLE 4

13-butyl-17-[bis(2-hydroxyethyl)amino]-gon-4-en-3-one

Following the procedure of Example 2 but substituting 13-butyl-17-[bis(2-hydroxyethyl)amino]-3-methoxygona - 1,3,5(10) - triene for 13-ethyl-17-[bis(2-hydroxyethyl)amino]-3-ethoxygona-1,3,5(10)-triene there is obtained 13-butyl-17-[bis(2-hydroxyethyl)amino]-gon-4-en-3-one.

EXAMPLE 5

17-[bis(2-hydroxyethyl)amino]-estr-4-en-3-one, dinitrate

A mixture of 24 ml. of acetic anhydride and 0.8 ml. of fuming nitric acid is treated at −30° with 400 mg. of 17-[bis(2-hydroxyethyl)amino]-estr-4-en-3-one.

The reaction mixture is gradually warmed up to a temperature of +10° and the solution is poured over ice. The mixture is then neutralized with sodium bicarbonate and extracted with ether. To the ether extract is added dropwise hydrogen chloride in isopropanol to yield crystals of 17-[bis(2-hydroxyethyl)amino]-estr-4-en-3-one, dinitrate. Recrystallization from methanol-ether solution yields a pure compound having a melting point of 133–134°.

*Analysis.*—Calcd. for $C_{22}H_{33}N_3O_7 \cdot HCl$: C, 54.14; H, 7.02; N, 8.61; Cl, 7.21. Found: C, 53.86; H, 6.97; N, 8.61; Cl, 7.40.

EXAMPLE 6

13-ethyl-17-[bis(2-hydroxyethyl)amino]-gon-4-en-3-one, dinitrate

Following the procedure of Example 5, but substituting 13 - ethyl-17-[bis(2-hydroxyethyl)amino]-gon-4-en-3-one for 17-[bis(2-hydroxyethyl)amino]-estr-4-en-one there is obtained 13-ethyl-17-[bis(hydroxyethyl)amino]-gon-4-en-3-one, dinitrate.

EXAMPLE 7

13-propyl-17-[bis(2-hydroxyethyl)amino]-gon-4-en-3-one, dinitrate

Following the procedure of Example 5, but substituting 13-propyl-17-[bis(2-hydroxyethyl)amino]-gon-4-en-3-one for 17-[bis(2-hydroxyethyl)amino]estr-4-en-3-one there is obtained 13-propyl 17-[bis(2-hydroxyethyl)amino]-gon-4-en-3-one, dinitrate.

EXAMPLE 8

13-butyl-17-[bis(2-hydroxyethyl)amino]-gon-4-en-3-one, dinitrate

Following the procedure of Example 5, but substituting 13 - butyl-17-[bis(2-hydroxyethyl)amino]-gon-4-en-3-one for 17-[bis(2-hydroxyethyl)amino]-estr-4-en-3-one there is obtained 13-butyl-17-bis(2-hydroxyethyl)amino]-gon-4-en-3-one, dinitrate.

The invention may be variously otherwise embodied within the scope of the appended claims.

What is claimed is:

1. A compound of the formula

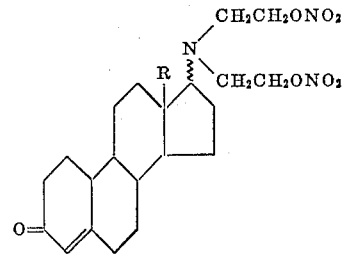

wherein R is an alkyl group of less than eight carbon atoms.

2. A compound according to claim 1 wherein R is methyl.

3. A compound according to claim 1 wherein R is ethyl.

4. A compound according to claim 1 wherein R is propyl.

5. A compound according to claim 1 wherein R is butyl.

6. A compound of the formula

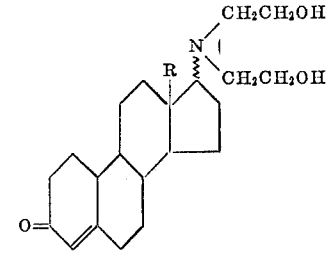

wherein R is an alkyl group of less than eight carbon atoms.

7. A compound according to claim 6 wherein R is ethyl.

References Cited

Steroid Reactions, p. 76 (1963), Djerassi, Holden-Day, San Francisco.

HENRY A. FRENCH, Primary Examiner

U.S. Cl. X.R.

260—999